United States Patent
Haus et al.

(10) Patent No.: US 9,775,296 B2
(45) Date of Patent: Oct. 3, 2017

(54) AGRICULTURAL CONCAVE HAVING A COMPONENT COATED WITH A HIGH HARDNESS MATERIAL

(71) Applicant: CNH Industrial America LLC, New Holland, PA (US)

(72) Inventors: Thomas P. Haus, Lancaster, PA (US); Benjamin Kemmerer, New Holland, PA (US); Wayne Flickinger, Oxford, PA (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/730,483

(22) Filed: Jun. 4, 2015

(65) Prior Publication Data
US 2016/0353662 A1    Dec. 8, 2016

(51) Int. Cl.
*A01F 12/24* (2006.01)
*C23C 4/10* (2016.01)
*C21D 1/18* (2006.01)
*A01F 12/16* (2006.01)

(52) U.S. Cl.
CPC .............. *A01F 12/24* (2013.01); *A01F 12/16* (2013.01); *C21D 1/18* (2013.01); *C23C 4/10* (2013.01)

(58) Field of Classification Search
CPC ........ A01F 12/24; A01F 12/442; A01F 12/26; A01F 7/06; A01F 7/062; A01F 12/18; A01F 12/30; A01F 12/446

USPC ...... 460/107, 108, 46; 56/14.6; 99/519, 600; 29/891
See application file for complete search history.

(56) References Cited

U.S. PATENT DOCUMENTS

| | | | | |
|---|---|---|---|---|
| 1,922,917 A | * | 8/1933 | Russell | E02F 9/285 172/701.3 |
| 3,092,115 A | | 6/1963 | Morgan | |
| 3,514,830 A | * | 6/1970 | Takakita | A01B 15/02 156/242 |
| 3,651,814 A | | 3/1972 | Vander Zanden | |
| 3,678,938 A | * | 7/1972 | De Coene | A01F 12/442 460/73 |
| 4,031,901 A | | 6/1977 | Rowland-Hill | |
| 4,450,635 A | * | 5/1984 | Shwayder | E01H 5/061 228/189 |
| 4,892,627 A | * | 1/1990 | Takada | C25D 15/02 205/148 |
| 4,909,772 A | * | 3/1990 | Kuchar | A01F 12/24 460/110 |
| 5,057,056 A | * | 10/1991 | Kambeitz | A01F 12/24 460/110 |
| 5,192,245 A | | 3/1993 | Francis et al. | |

(Continued)

FOREIGN PATENT DOCUMENTS

DE    850531 C    9/1952
DE    3339846 A1 * 5/1985 ............. A01B 15/02
(Continued)

*Primary Examiner* — Arpád Fábián-Kovács
(74) *Attorney, Agent, or Firm* — Patrick M. Sheldrake

(57) ABSTRACT

An agricultural harvester includes a chassis and a threshing and separating section carried by the chassis that is configured for threshing and separating grain from gathered crop material. The threshing and separating section includes at least one concave with at least one crop engaging surface having a high hardness coating formed thereon.

13 Claims, 4 Drawing Sheets

(56) References Cited

U.S. PATENT DOCUMENTS

| | | | | |
|---|---|---|---|---|
| 5,489,239 | A | * | 2/1996 | Matousek .............. A01F 12/28 460/109 |
| 5,569,080 | A | * | 10/1996 | Estes ..................... A01F 12/24 460/110 |
| 6,074,297 | A | * | 6/2000 | Kuchar .................. A01F 12/20 460/46 |
| 6,234,072 | B1 | * | 5/2001 | Kooima ............... A01D 43/081 460/108 |
| 6,264,553 | B1 | * | 7/2001 | Neumann ............. A01F 12/20 460/71 |
| 6,327,970 | B1 | | 12/2001 | Kooima et al. |
| 6,358,142 | B1 | * | 3/2002 | Imel ...................... A01F 12/28 460/107 |
| 6,729,952 | B2 | | 5/2004 | Voss et al. |
| 7,166,026 | B2 | * | 1/2007 | Ricketts ................ A01F 12/26 460/108 |
| 7,285,043 | B2 | | 10/2007 | Foster et al. |
| 8,313,360 | B2 | | 11/2012 | Murray et al. |
| 2007/0202350 | A1 | * | 8/2007 | Humphreys ............. C23C 4/06 428/627 |
| 2014/0166797 | A1 | * | 6/2014 | Den Boer .............. A01D 43/10 241/296 |
| 2015/0017394 | A1 | | 1/2015 | Johnson |
| 2015/0087363 | A1 | * | 3/2015 | Holtmann .............. A01F 7/067 460/75 |

FOREIGN PATENT DOCUMENTS

| | | | | |
|---|---|---|---|---|
| FR | 2607027 A1 | * | 5/1988 | .............. B02B 3/00 |
| WO | 2013/053841 A1 | | 4/2013 | |

* cited by examiner

AGRICULTURAL CONCAVE HAVING A COMPONENT COATED WITH A HIGH HARDNESS MATERIAL

BACKGROUND OF THE INVENTION

1. Field of the Invention

The present invention relates to agricultural harvesters, and, more particularly, to agricultural harvesters with concaves.

2. Description of the Related Art

An agricultural harvester known as a "combine" is historically termed such because it combines multiple harvesting functions with a single harvesting unit, such as picking, threshing, separating and cleaning A combine includes a header, which removes the crop from a field, and a feeder housing which transports the crop matter into a threshing rotor. The threshing rotor rotates within a perforated housing, which may be in the form of adjustable concaves and performs a threshing operation on the crop to remove the grain. Once the grain is threshed it falls through perforations in the concaves onto a grain pan. From the grain pan the grain is cleaned using a cleaning system, and is then transported to a grain tank onboard the combine. A cleaning fan blows air through the sieves to discharge chaff and other debris toward the rear of the combine. Non-grain crop material such as straw from the threshing section proceeds through a residue system, which may utilize a straw chopper to process the non-grain material and direct it out the rear of the combine. When the grain tank becomes full, the combine is positioned adjacent a vehicle into which the grain is to be unloaded, such as a semi-trailer, gravity box, straight truck, or the like; and an unloading system on the combine is actuated to transfer the grain into the vehicle.

More particularly, a rotary threshing or separating system includes one or more rotors which can extend axially (front to rear) or transversely within the body of the combine, and which are partially or fully surrounded by a perforated concave. The crop material is threshed and separated by the rotation of the rotor within the concave. Coarser non-grain crop material such as stalks and leaves are transported to the rear of the combine and discharged back to the field. The separated grain, together with some finer non-grain crop material such as chaff, dust, straw, and other crop residue are discharged through the concaves and fall onto a grain pan where they are transported to a cleaning system. Alternatively, the grain and finer non-grain crop material may also fall directly onto the cleaning system itself A cleaning system further separates the grain from non-grain crop material, and typically includes a fan directing an airflow stream upwardly and rearwardly through vertically arranged sieves which oscillate in a fore and aft manner. The airflow stream lifts and carries the lighter non-grain crop material towards the rear end of the combine for discharge to the field. Clean grain, being heavier, and larger pieces of non-grain crop material, which are not carried away by the airflow stream, fall onto a surface of an upper sieve (also known as a chaffer sieve) where some or all of the clean grain passes through to a lower sieve (also known as a cleaning sieve). Grain and non-grain crop material remaining on the upper and lower sieves are physically separated by the reciprocating action of the sieves as the material moves rearwardly. Any grain and/or non-grain crop material remaining on the top surface of the upper sieve are discharged at the rear of the combine. Grain falling through the lower sieve lands on a bottom pan of the cleaning system, where it is conveyed forwardly toward a clean grain auger.

The clean grain auger conveys the grain to a grain tank for temporary storage. The grain accumulates to the point where the grain tank is full and is discharged to an adjacent vehicle such as a semi trailer, gravity box, straight truck or the like by an unloading system on the combine that is actuated to transfer grain into the vehicle.

In some threshing and separating systems, the rotor rotates to force the gathered crop material against rub bars of the concave as the crop material is advanced by the rotor. The force pushing the crop material into and across the rub bars creates a rubbing action that separates grain material from non-grain material, with the grain material then being able to pass through perforations between adjacent rub bars. Due to the high amount of crop material processed and contaminants such as soil and rocks also rubbing against the rub bars, the rub bars are subjected to large amounts of abrasion throughout the harvesting procedure. This abrasion wears away the rub bars of the concave and can cause wires of the concave to be exposed to the crop material, at which point the concave is considered worn out and should be replaced.

To harden the rub bars, it is known to use an induction hardening process. The rub bars, which can be made from a 1045 hot rolled plate steel, can then have a hardened case depth of 3-5 mm with a hardness of 40-45 on the Rockwell C Scale Hardness (HRC) scale. This induction hardening allows the rub bars to run for a longer period of time, but increased crop throughputs of agricultural harvesters have rendered this longer period of time insufficient. Specifically, the run time of induction hardening treated rub bars may not be the entirety of a single harvesting season, which is considered unacceptable due to the short replacement interval and the high cost of replacement parts.

It is also known to boronize components of the concave, such as the rub bars, to harden them. In the boronizing process, boron is introduced into a metal or metal alloy through a diffusion process. Typically, the component is packed with a boriding mixture and heated to a temperature of between approximately 1550 and 1750° F. so that some of the component's iron atoms (when the component is formed of iron or ferrous steel) are converted into iron boride. The boriding mixture can include boron carbide powder and potassium tetrafluoroborate as a flux material. Some disadvantages of boronizing components is that the process used is rather inflexible and labor intensive and the volume change of the component due to boronizing can be difficult to control. Further, if the boronizing process causes any undesired shape changes of the component, it is difficult to machine the component back to the desired shape.

What is needed in the art is an agricultural concave that can operate for a longer period of time before needing to be replaced and can be created in a more easily controlled manner.

SUMMARY OF THE INVENTION

The present invention provides an agricultural harvester with a concave having a crop engaging surface that has a high hardness coating formed thereon.

The invention in one form is directed to an agricultural harvester including: a chassis; and a threshing and separating section carried by the chassis and that is configured for threshing and separating grain from gathered crop material. The threshing and separating section includes at least one concave with at least one crop engaging surface. The at least one crop engaging surface has a high hardness coating formed thereon.

The invention in another form is directed to a concave for an agricultural harvester including: at least one rub bar having at least one opening formed therethrough; at least one wire held in the at least one opening formed in the at least one rub bar; and a high hardness coating formed on the at least one rub bar and/or the at least one wire.

The invention in yet another form is directed to a method of coating an agricultural component including the steps of: providing a concave component having a crop engaging surface; applying a high hardness coating on the crop engaging surface; and bonding the applied high hardness coating to the crop engaging surface by heating the applied high hardness coating to a temperature of at least 1900° F.

An advantage of the present invention is the hardness of the crop engaging surfaces of the concave can be increased.

Another advantage is the coating applied to the graining engaging surface can be precisely controlled.

Yet another advantage is the high hardness coating is discernible to a user and will visually indicate an added level of wear resistance.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

The terms "grain", "straw" and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, MOG or straw. Incompletely threshed crop material is referred to as "tailings". Also the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting.

Figure 1:
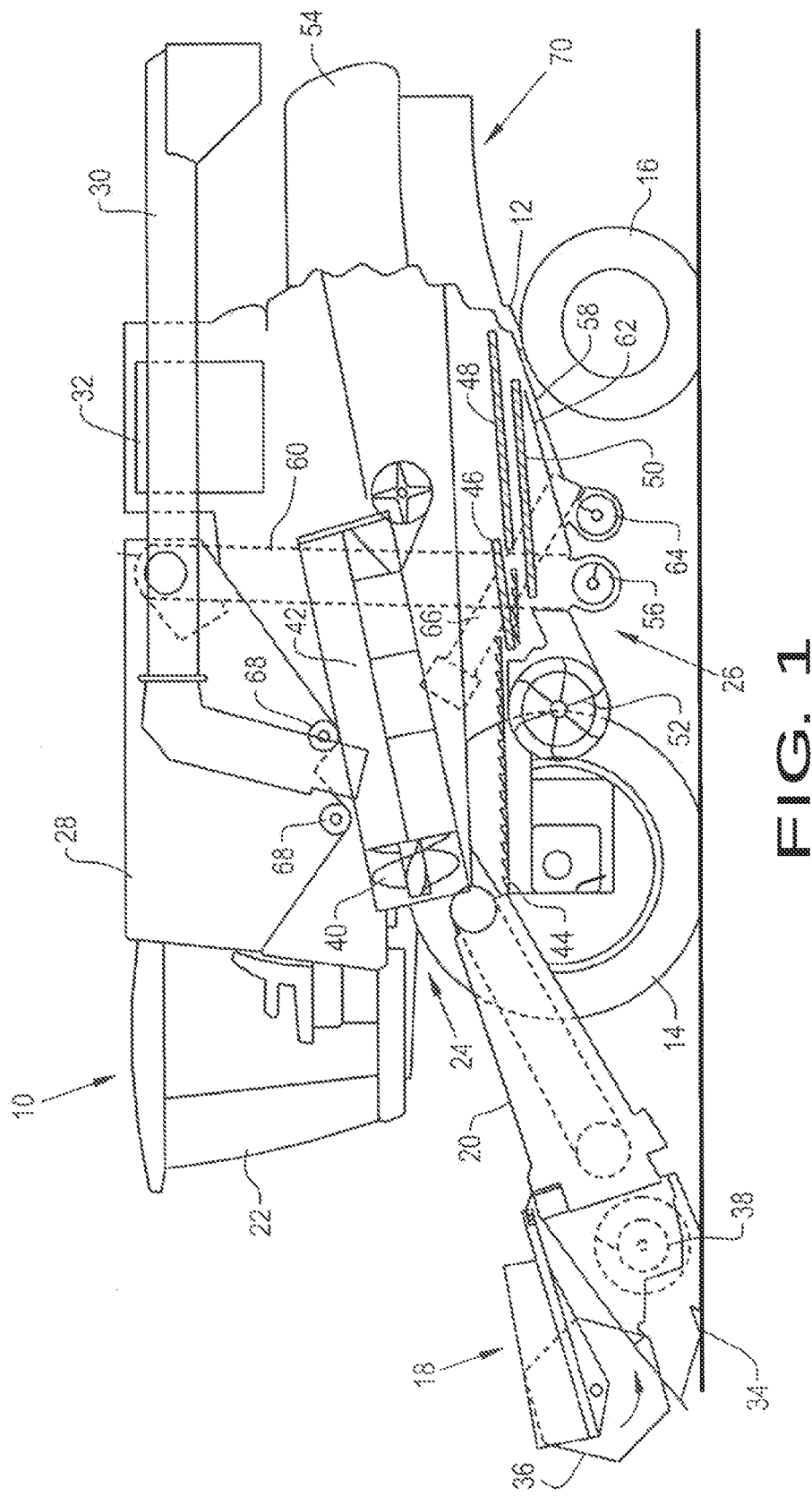
FIG. 1 is a side view of an embodiment of an agricultural harvester according to the present invention.

Referring now to the drawings, and more particularly to FIG. 1, there is shown an agricultural harvester in the form of a combine 10, which generally includes a chassis 12, ground engaging wheels 14 and 16, a header 18, a feeder housing 20, an operator cab 22, a threshing and separating system 24, a cleaning system 26, a grain tank 28, and an unloading conveyance 30. Unloading conveyor 30 is illustrated as an unloading auger, but can also be configured as a belt conveyor, chain elevator, etc.

The front wheels 14 are larger flotation type wheels, and the rear wheels 16 are smaller steerable wheels. Motive force is selectively applied to the front wheels 14 through a power plant in the form of a diesel engine 32 and a transmission (not shown). Although the combine 10 is shown as including wheels, is also to be understood that the combine 10 may include tracks, such as full tracks or half-tracks.

The header 18 is mounted to the front of the combine 10 and includes a cutter bar 34 for severing crops from a field during forward motion of the combine 10. A rotatable reel 36 feeds the crop into the header 18, and an auger 38 feeds the severed crop laterally inwardly from each side toward the feeder housing 20. The feeder housing 20 conveys the cut crop to the threshing and separating system 24, and is selectively vertically movable using appropriate actuators, such as hydraulic cylinders (not shown).

The threshing and separating system 24 is of the axial-flow type, and generally includes a rotor 40 at least partially enclosed by and rotatable within a corresponding perforated concave 42. The cut crops are threshed and separated by the rotation of the rotor 40 within the concave 42, and larger elements, such as stalks, leaves and the like are discharged from the rear of the combine 10. Smaller elements of crop material including grain and non-grain crop material, including particles lighter than grain, such as chaff, dust and straw, are discharged through perforations of the concave 42. Although the threshing and separating system 24 is illustrated as being of an axial-flow type having a rotor, it is also contemplated to use the present invention with other conventional threshing systems.

Grain, which has been separated by the threshing and separating assembly 24, falls onto a grain pan 44 and is conveyed toward the cleaning system 26. The cleaning system 26 may include an optional pre-cleaning sieve 46, an upper sieve 48 (also known as a chaffer sieve), a lower sieve 50 (also known as a cleaning sieve), and a cleaning fan 52. Grain on the sieves 46, 48 and 50 is subjected to a cleaning action by the fan 52 which provides an airflow through the sieves to remove chaff and other impurities such as dust from the grain by making this material airborne for discharge from the straw hood 54 of the combine 10. The grain pan 44 and the pre-cleaning sieve 46 oscillate in a fore-to-aft manner to transport the grain and finer non-grain crop material to the upper surface of the upper sieve 48. The upper sieve 48 and the lower sieve 50 are vertically arranged relative to each other, and likewise oscillate in a fore-to-aft manner to spread the grain across the sieves 48, 50, while permitting the passage of cleaned grain by gravity through the openings of the sieves 48, 50.

Clean grain falls to a clean grain auger 56 positioned crosswise below and in front of the lower sieve 50. The clean grain auger 56 receives clean grain from each sieve 48, 50 and from the bottom pan 58 of the cleaning system 26. The clean grain auger 56 conveys the clean grain laterally to a generally vertically arranged grain elevator 60 for transport to the grain tank 28. Tailings from the cleaning system 26 fall to a tailings auger trough 62. The tailings are transported via the tailings auger 64 and the return auger 66 to the upstream end of the cleaning system 26 for repeated cleaning action. The cross augers 68 at the bottom of the grain tank 28 convey the clean grain within the grain tank 28 to the unloading auger 30 for discharge from the combine 10.

The non-grain crop material proceeds through a residue handling system 70. The residue handling system 70 may include a chopper, counter knives, a windrow door and a residue spreader.

Figure 2:
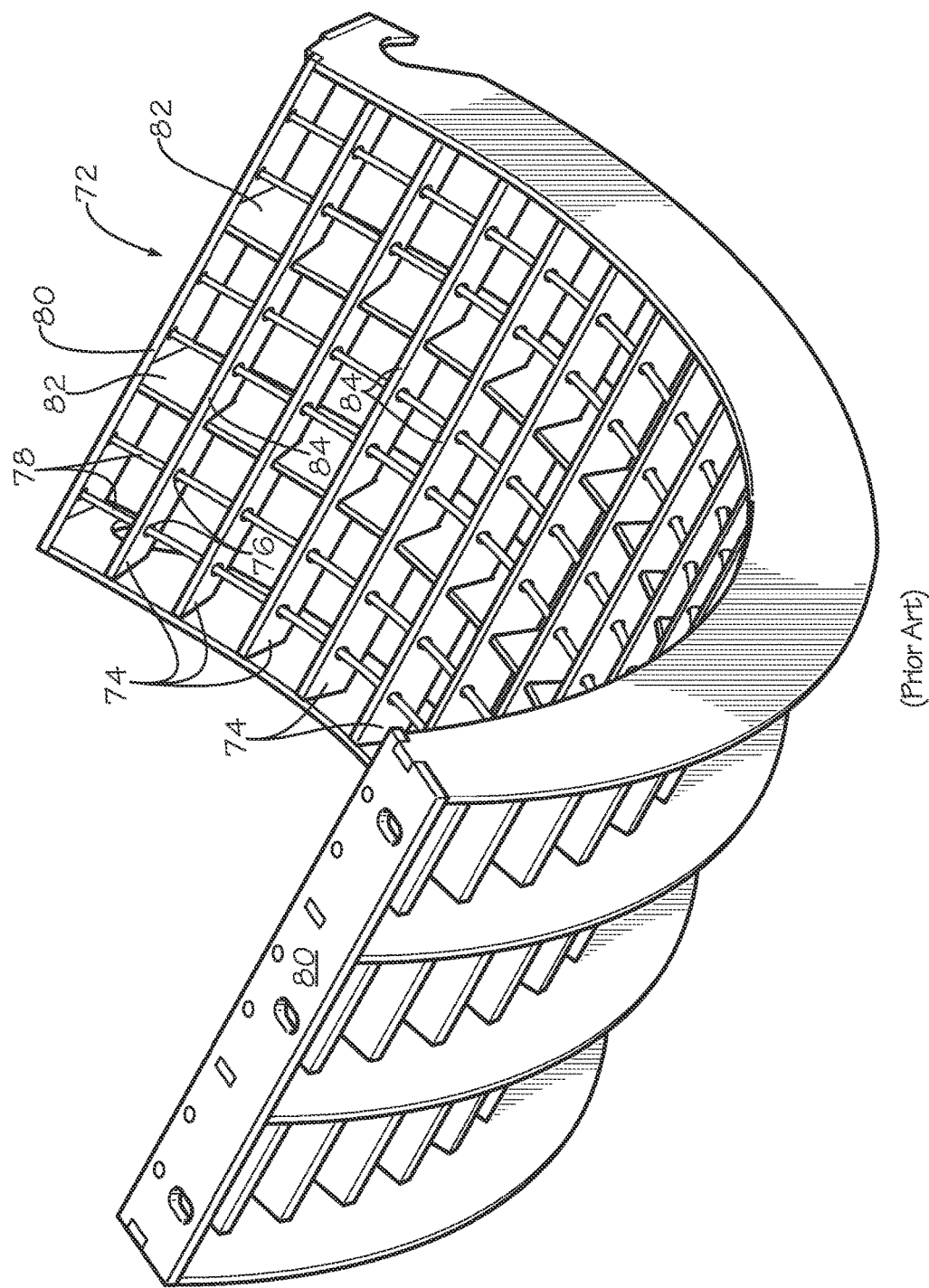
FIG. 2 is a perspective view of a prior art concave module.

Referring now to FIG. 2, there is illustrated a prior art concave 72 that can be included in a threshing and separating assembly of an agricultural harvester. As can be seen, the concave 72 includes a plurality of rub bars 74 with openings 76, and wires 78 held in the openings 76 and extending between two edges 80. The rub bars 74 can be held in support plates 82 extending between the edges 80 and have functional surfaces 84 defining an interior of the concave 72 that crop material will be rubbed against, by a rotor or otherwise, to separate grain material from non-grain material. Once the grain material is separated, it can fall through perforations formed between adjacent rub bars 74 and into a grain pan. It can therefore be seen that the functional surfaces 84 of the rub bars 74 are crop engaging surfaces that provide abrasion to separate the grain material from the non-grain material.

Figure 3:
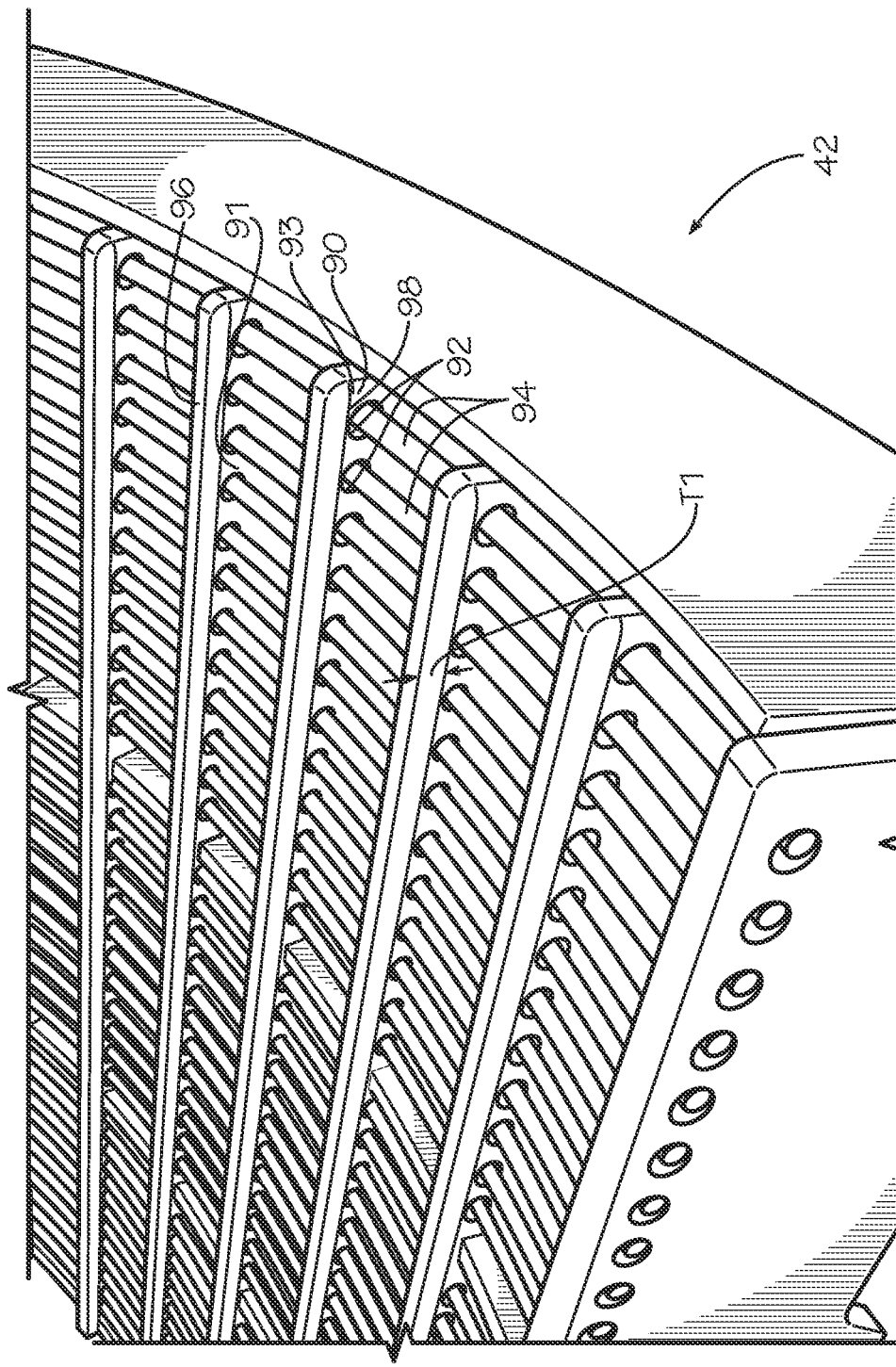
FIG. 3 is a perspective view of a concave formed according to the present invention.

Referring now to FIG. 3, an embodiment of a concave 42 formed according to the present invention is shown that can include rub bars 90 having openings 92 formed therethrough and wires 94 held in the openings 92 of the rub bars 90. The configuration of the concave 42 can be similar to the concave 72 shown in FIG. 2, if desired, or otherwise. Unlike the concave 72 shown in FIG. 2, a high hardness coating 96 is formed on one or more crop engaging surfaces 98 of the concave 42, which are shown as functional surfaces of the rub bars 90. Since the high hardness coating 96 can cover most or all of the crop engaging surfaces 98 of the rub bars 90, the high hardness coating 96 extends the crop engaging surfaces 98 by a thickness T1 of the coating 96 and will come into abrasive contact with crop material in the concave 42 to separate the grain material from the non-grain material. The thickness T1 of the formed high hardness coating 96 can be 200 microns or more, depending on the desired longevity of the high hardness coating 96 and geometry of the coated part. While the high hardness coating 96 is shown as being formed on the rub bars 90, it should be appreciated that the high hardness coating 96 can also be formed on one or more wires 94, which may also come into contact with crop material if its covering rub bar 90 has been sufficiently abraded.

The high hardness coating 96 is a coating which has a higher hardness than induction hardened stainless steel, which is typically used as the material for the rub bars 90. The hardness of induction hardened stainless steel is typically about 40-45 on the Rockwell C Scale Hardness (HRC) scale, so the high hardness coating 96 will have an HRC of greater than 45. This higher hardness results in rub bars 90 that can separate a greater amount of grain from non-grain before wearing out and needing to be replaced.

The high hardness coating 96 can comprise a metal matrix composite, which includes a hard material aggregate and a metallic matrix that holds the hard material aggregate. One example of such a material is a tungsten carbide aggregate held in a nickel-chrome self-fluxing matrix. The tungsten carbide particles can have a micro-hardness of 75 HRC while the nickel-chrome matrix can have a matrix hardness of between 55-66 HRC, producing a very high hardness coating with a minimum localized hardness of 55 HRC. In addition to having a high hardness, a tungsten carbide and nickel-chrome coating can be corrosive resistant, to prevent the functional surfaces 98 of the rub bars 90 from oxidizing. Further, the high hardness coating 96 can be visually discernible to a user, due to its different color, from the rubs bars 90 so the user knows that the concave 42 incorporates the high hardness coating 96. It should be appreciated that other high hardness coatings 96 can be formed on the functional surface 98 with or without tungsten carbide and a metallic matrix, and that these materials are exemplary only.

Optionally, the rub bars 90 can include a first portion 91 that is formed of an unhardened material, such as 1045 steel, and a second portion 93 that is formed of the unhardened material but has been subjected to a hardening treatment, such as induction hardening, so the second portion 93 has a higher hardness than the first portion 91. It should be appreciated that the second portion 93 can be hardened by any suitable process and induction hardening is only given as an example of such a process. As shown in FIG. 3, the first portion 91 of the rub bars 90 can be a portion of the rub bars 90 adjacent the openings 92 where the wires 94 are held and the second portion 93 can be above the openings 92 and include the crop engaging surface 98. Such a configuration provides concave 42 with one or more rub bars 90 that have a high hardness coating 96 formed on the crop engaging surfaces 98 of the rub bars 90, a second portion 93 defining a hardened region which includes the crop engaging surfaces 98 underneath the high hardness coating 96 that will have an increased hardness to resist abrasive wear should the high hardness coating 96 wear or chip off, and a first portion 91 defining an unhardened region that is formed from an unhardened material following the second portion 93. By leaving the first portion 91 unhardened, the first portion 91 can provide a region that can be welded to other components of the concave 42 using standard welding techniques, due to the first portion 91 being unhardened, and also provides ductility and toughness so that the rub bar 90 is less likely to fracture when impacted by rocks or other foreign objects. Further, the first portion 91 being unhardened allows for production costs to be lowered since less energy and/or material is necessary to only harden the second portion 93 of the rub bars 90 compared to hardening the entirety of the rub bars 90.

Figure 4:
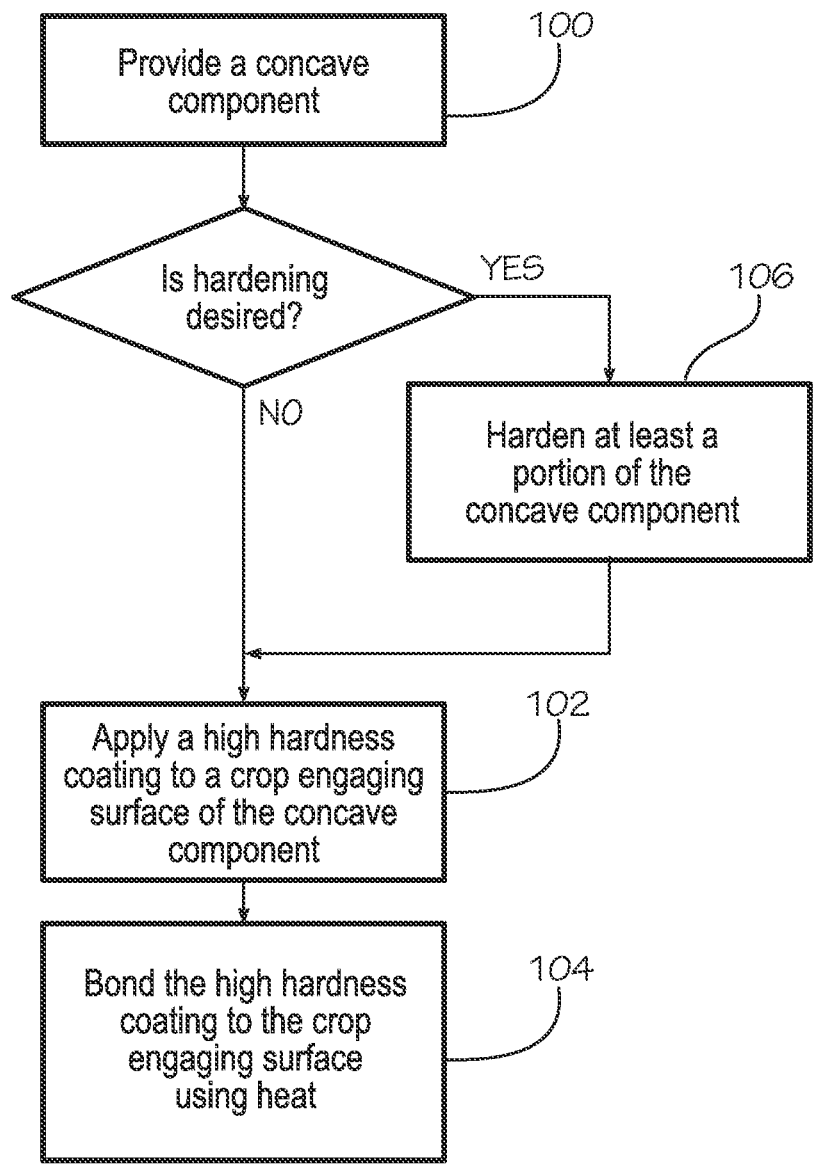
FIG. 4 is a step diagram of an embodiment of a method according to the present invention.

To form the high hardness coating 96 on a crop engaging surface 98 of the concave 42, and with further reference now to FIG. 4, a concave component, such as a rub bar 90, is provided, as indicated in box 100 of FIG. 4. The concave component can be any part of the concave 42 that has a crop engaging surface, such as functional surface 98, which will come into contact with crop material in the concave 42 to abrade the crop material and separate the grain material from the non-grain material. A high hardness coating, such as coating 96, is applied to the crop engaging surface 98 of the concave component 90, as indicated in box 102 of FIG. 4. The high hardness coating 96 can be applied to the crop engaging surface 98 as a powder comprising at least 35 mass % tungsten carbide, with a remainder (65 mass % or less) of the powder including other materials, such as a metallic matrix. The metallic matrix can be a nickel-chrome self-fluxing matrix, as previously described. The high hardness coating 96 can be applied to the crop engaging surface 98 by any method, such as by using a thermal sprayer, a plasma arc sprayer, a laser, etc. When, for example, a thermal spray process is used to apply the high hardness coating 96, the high hardness coating 96 can be selectively sprayed onto the crop engaging surface 98 in layers to a desired thickness, allowing for precise control of the high hardness coating 96 geometry and placement. Once the high hardness coating 96 is applied to the crop engaging surface 98, the high hardness coating 96 is bonded to the crop engaging surface 98 by being heated to a temperature of at least 1900° F., as indicated in box 104 in FIG. 4. The bonding step 104 can include placing the concave component 90 with the applied high hardness coating 96 in a furnace at a temperature between 1950 and 2000° F. Heating the high hardness coating 96 to such a high temperature forms a metallurgical bond between the high hardness coating 96 and the crop engaging surface 98, to help ensure a well-adhered coating on the concave component 90 that will not chip off the concave component 90 due to high impact loads from rocks or other objects during use. Optionally, a portion 93 including the crop engaging surface 98 or all of the concave component 90 can be hardened through a hardening step, as indicated by box 106 in FIG. 4. The hardening step can be, for example, an induction hardening process where the portion 93 including the crop engaging surface 98 or all of the concave component 90 is heated to an appropriately high temperature for the concave component's 90 base material and then quickly quenched to increase the hardness of the concave component 90. As shown in FIG. 4 and previously described, the hardening step 106 can take place before the high hardness coating 96 is applied 102 so that the high hardness coating 96 is applied to the hardened crop engaging surface 98 of the concave component 90. The hardening step 106 can also be performed after the high hardness coating 96 is applied 102 to the crop engaging surface 98 or both before and after the high hardness coating 96 is applied 102 to the crop engaging surface 98. Following the bonding step 104, and optional hardening step 106, the coated concave component 90 can be welded to other components of the concave 42 to assemble a completed concave 42.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural harvester, comprising:
    a chassis; and
    a threshing and separating section carried by said chassis and configured for threshing and separating grain from gathered crop material, said threshing and separating section including a rotor and at least one concave at least partially enclosing said rotor and having a rub bar with at least one crop engaging surface facing said rotor, said rub bar including a first region with a first hardness and a second region which includes said at least one crop engaging surface and has a second hardness, said at least one crop engaging surface having a high hardness coating formed thereon, said second hardness of said second region being greater than said first hardness of said first region and less than a coating hardness of said high hardness coating formed on said at least one crop engaging surface.

2. The agricultural harvester according to claim 1, wherein said coating hardness is greater than 55 Rockwell C Scale Hardness (HRC).

3. The agricultural harvester according to claim 2, wherein said coating hardness is at least 65 HRC.

4. The agricultural harvester according to claim 1, wherein said high hardness coating comprises tungsten carbide.

5. The agricultural harvester according to claim 4, wherein said high hardness coating comprises a metal matrix composite including a tungsten carbide aggregate and a nickel-chrome matrix.

6. The agricultural harvester according to claim 1, wherein said first portion is an unhardened region and said second portion is a hardened region.

7. A concave for an agricultural harvester defined about a central axis, comprising:
    at least one rub bar having at least one opening formed therethrough;
    at least one wire held in said at least one opening formed in said at least one rub bar; and
    a high hardness coating formed on a surface of a second portion of at least one of said at least one rub bar and said at least one wire, said second portion being connected to a first portion, said second portion having a second hardness which is greater than a first hardness of said first portion and less than a coating hardness of said high hardness coating formed on said surface of said second portion, said surface of said second portion facing said central axis of said concave.

8. The concave according to claim 7, wherein said coating hardness is greater than 55 Rockwell C Scale Hardness (HRC).

9. The concave according to claim 8, wherein said coating hardness is at least 65 HRC.

10. The concave according to claim 7, wherein said high hardness coating comprises tungsten carbide.

11. The concave according to claim 10, wherein said high hardness coating comprises a metal matrix composite including a tungsten carbide aggregate and a nickel-chrome matrix.

12. The concave according to claim 7, wherein said high hardness coating is formed on a crop engaging surface of said at least one rub bar.

13. The concave according to claim 12, wherein said first portion is an unhardened region and said second portion is a hardened region.

* * * * *